United States Patent [19]

Harvey

[11] 4,175,853
[45] Nov. 27, 1979

[54] PHOTOGRAPHIC PRINTER WITH DICHROIC FILTER RESET INDICATORS

[75] Inventor: Ronald B. Harvey, Minneapolis, Minn.

[73] Assignee: Pako Corporation, Minneapolis, Minn.

[21] Appl. No.: 881,422

[22] Filed: Feb. 27, 1978

[51] Int. Cl.² .............................................. G03B 27/78
[52] U.S. Cl. ......................................... 355/38; 355/77
[58] Field of Search .................................. 355/35–38, 355/32, 88, 77

[56] References Cited

U.S. PATENT DOCUMENTS

| | | | |
|---|---|---|---|
| 3,292,488 | 12/1966 | Griffith | 355/38 |
| 3,754,824 | 8/1973 | Weisglass et al. | 355/35 |
| 3,873,109 | 3/1975 | Weinert | 355/88 X |
| 4,008,962 | 2/1977 | Nepper | 355/77 |
| 4,030,833 | 6/1977 | Barbieri | 355/38 X |

Primary Examiner—George H. Miller, Jr.
Assistant Examiner—W. J. Brady
Attorney, Agent, or Firm—Kinney, Lange, Westman and Fairbairn

[57] ABSTRACT

A photographic printer includes a system for indicating the direction of movement of the dichroic filters required to re-establish color balance whenever a setup is changed. Signals are stored for each of the plurality of setups which are determinative of the desired filter position for achieving color balance with that setup. When one of the setups is selected, a parameter is sensed which is related to the filter position. The signals generated as a function of the sensed parameter are compared to the stored signals, and an indication of the direction of movement, if any, necessary to move the filters to the desired filter positions for that selected setup is provided.

10 Claims, 6 Drawing Figures

PHOTOGRAPHIC PRINTER WITH DICHROIC FILTER RESET INDICATORS

BACKGROUND OF THE INVENTION

The present invention relates to photographic printers. In particular, the present invention is a system which provides signals indicative of the direction of movement of filters which adjust the color content of print light in order to facilitate quick changeover from one setup to another setup.

Photographic printers produce color or black and white prints of transparencies from photographic film originals (generally negatives). High intensity light is passed through the film and imaged on the photosensitive print medium (film or paper). The photographic emulsion layers on the print paper or film are exposed and subsequently processed to produce a print or transparency of the scene contained in the film original.

In most photographic printers, the color content of the print light is adjusted by means of movable dichroic filters. Color balancing procedures are used to properly position or select filters so that the printing light has the proper spectral content. In general, each "setup" for a different film/paper combination requires a different color balance. As a result, each time the operator of the printer changes from one setup to another, the color balance and the position of the movable filters must be changed. The changeover has normally been achieved by recording the desired dichroic filter dial positions and then resetting the dials to those numbers each time the particular setup is used.

SUMMARY OF THE INVENTION

The photographic printer of the present invention simplifies the resetting of filter positions when setups are changed. The necessity of recording filter settings and later referring back to these settings is eliminated.

In the present invention, storage means stores signals which are determinitive of the desired filter positions for each of a plurality of setups. These desired filter positions are initially determined during initial color balancing procedures for each of the setups and are updated in the event that the color balance for that setup is revised or changed.

When one of the plurality of setups is selected, sensing means senses a parameter which is related to filter position and provides sensor signals which are a function of the sensed parameter. Based upon the stored signals and the sensor signals, the printer produces signals indicative of the direction of movement, if any, necessary to move the filters to the desired filter positions for the selected setup.

In one preferred embodiment of the present invention, the signals indicative of the direction of movement are supplied to visual indicators, which provide a visual indication to the operator of the direction of movement required for the filters. The operator, therefore, can reset the filters to the desired filter position merely by observing the visual indicators.

DETAILED DESCRIPTION OF THE PREFERRED EMBODIMENTS

The photographic printer of the present invention provides a simplified color balancing system which permits the operator to rapidly re-establish color balance with the filters whenever the setup is changed. In the preferred embodiments, the capability of the printer to read negative densities and store these values is used in initially balancing and in re-establishing balance of the printer.

Figure 1:
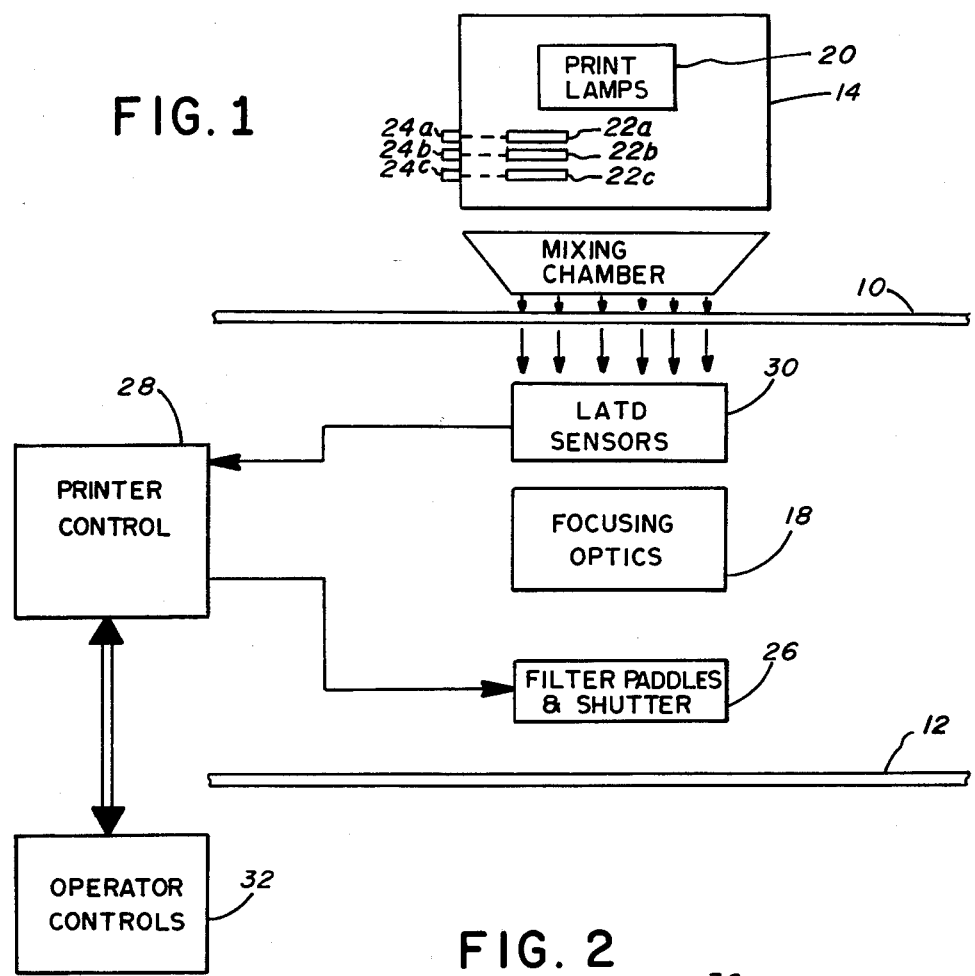
FIG. 1 is a system block diagram illustrating the photographic printer of the present invention.

FIG. 1 illustrates a photographic printer system. In this printer, an image contained in film 10 is printed onto photosensitive paper 12. Light from lamphouse assembly 14 is mixed and diffused by mixing chamber 16 and passed through a frame of film 10. The light is then focused by focusing optics 18 onto an appropriate portion of paper 12.

In the preferred embodiments of the present invention, lamphouse assembly 14 includes one or more print lamps 20, a plurality of filters 22a, 22b, and 22c, and corresponding adjusting knobs 24a, 24b, and 24c. Filters 22a-22c are typically dichroic subtractive filters. By moving adjusting knobs 24a-24c, the corresponding subtractive filters 22a-22c are positioned in the path of light from print lamps 20 to adjust the color content of the light.

The exposure time during which paper 12 is exposed to the image from film 10 is determined by the position of filter paddles and shutter 26. The filter paddles typically include a subtractive filter for each color channel (red, green, and blue). Filter paddles and shutter 26 are controlled by printer control 28.

In the embodiment shown in FIG. 1, printer control 28 receives input signals from large area transmission density (LATD) sensors 30 and from operator controls 32. In addition to the exposure control functions, printer control 28 may also control such functions as paper and film feed.

Figure 2:
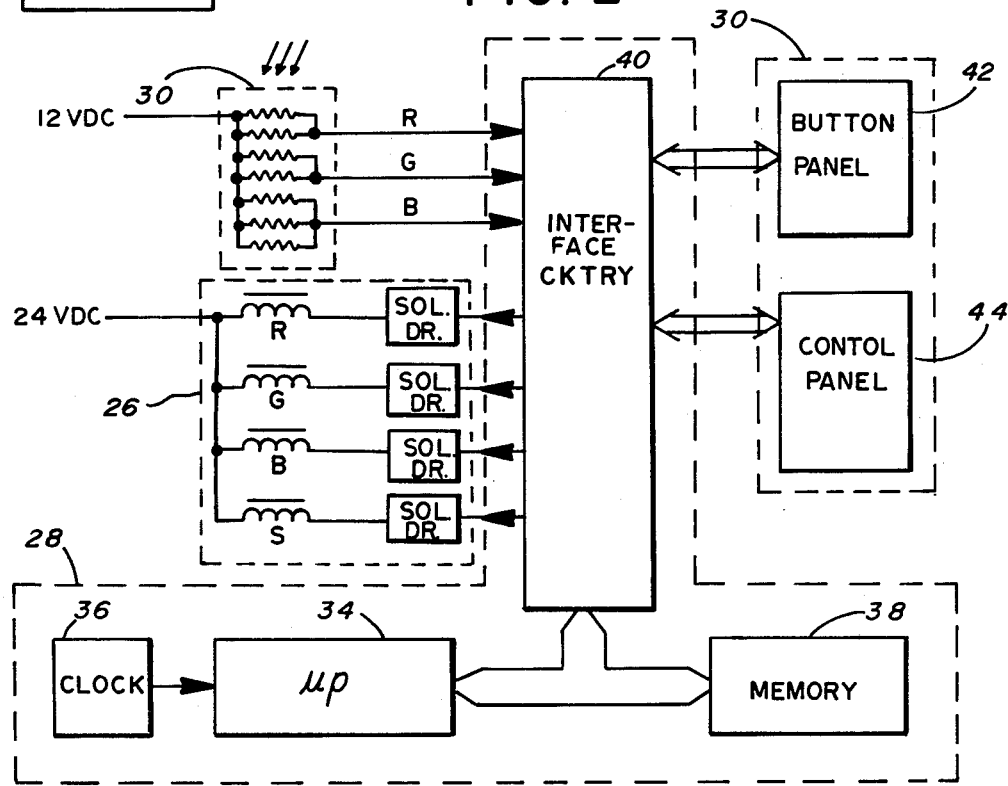
FIG. 2 is a block diagram illustrating the control system of the printer of FIG. 1.

FIG. 2 shows a preferred embodiment of printer control 28 as it interreacts with filter paddles and shutter 26, LATD sensors 30, and operator controls 32. As shown in FIG. 2, printer control 28 includes digital processing and storage capabilities. In particular, printer control 28 includes a microprocessor 34, clock circuitry 36, memory 38, and interface circuitry 40. Memory 38 preferably contains both read/write and read-only memory storage.

Interface circuitry 40 receives the red, green, and blue signals from LATD sensors 30 and converts these signals to digital values for use by microprocessor 34. Similarly, interface circuitry 40 provides the appropriate signals from microprocessor 34 to the appropriate solenoid driver associated with filter paddles and shutter 26.

In the preferred embodiment shown in FIG. 2, operator controls 32 include button panel 42 and control panel 44. These two panels are shown in further detail in FIGS. 3 and 4. Interface circuitry 40 multiplexes and supplies the various signals from button panel 42 and control panel 44 to microprocessor 34, and supplies the appropriate driving signals to panels 42 and 44 to control the various displays contained on these panels.

Figure 3:
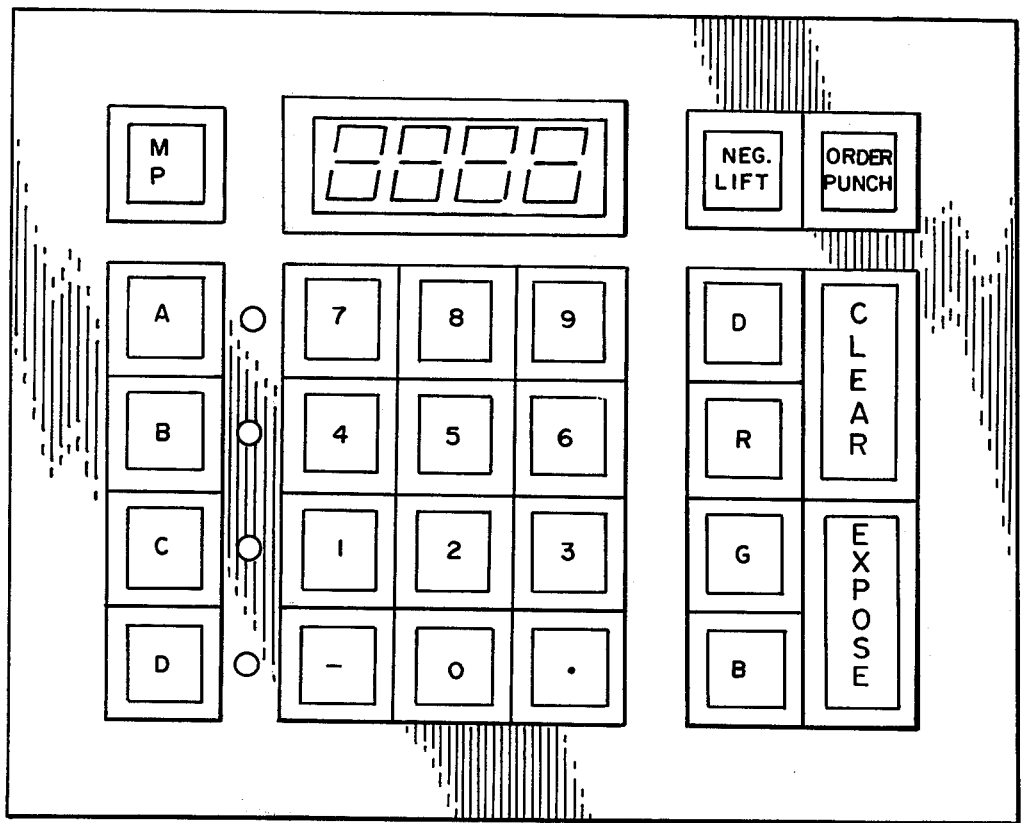
FIG. 3 shows the operator button panel of the photographic printer.

FIG. 3 shows button panel 42, which includes a keyboard through which color and density button corrections can be made. A digital display shows the amount of correction entered for each color channel. These density and color correction buttons are used during the color balancing procedure to determine the color balance for each setup. In addition, the density and color correction buttons may be used during normal printing operation to make color or density corrections which the operator deems necessary for the particular negative.

Density and color button corrections from button panel 42 are provided to microprocessor 34 through interface circuitry 40. Microprocessor 34 converts the digital density and color button values to the digital exposure time value which yields the desired density change. These exposure times are then added to or subtracted from the normal exposure time stored in memory 38 for that setup.

Figure 4:
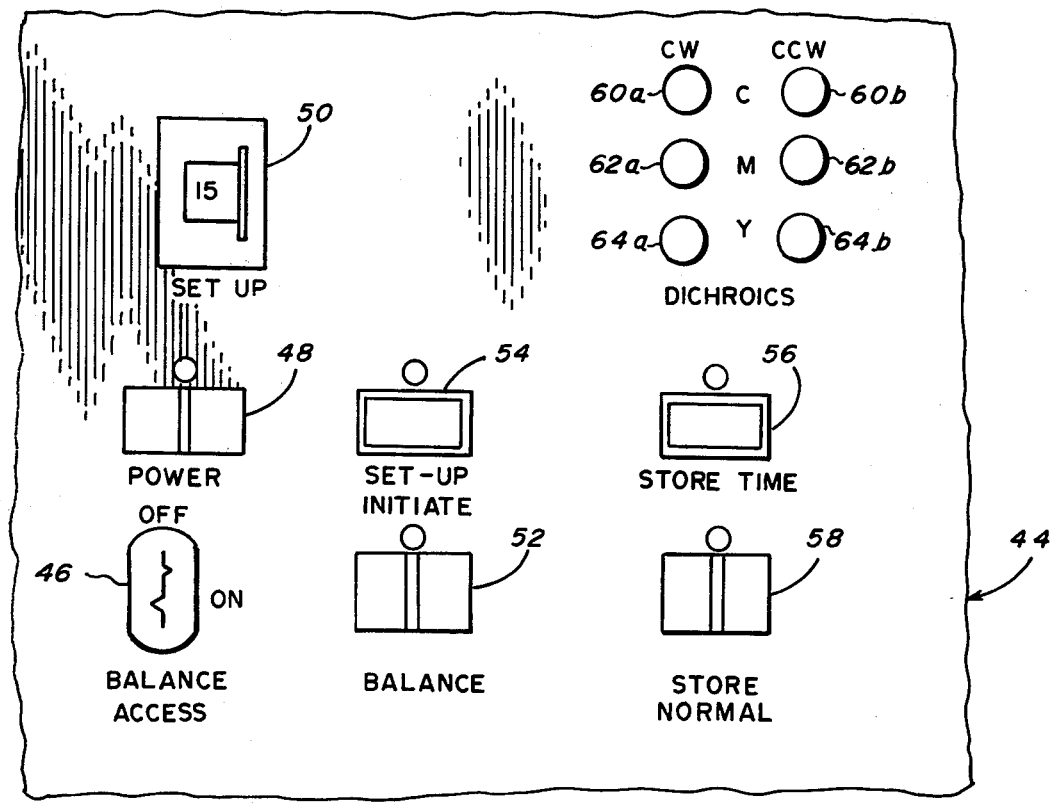
FIG. 4 shows a portion of the operator control panel of the photographic printer.

FIG. 4 shows a portion of control panel 44. Only those portions of control panel 44 which are directly related to the color balancing of the present invention are shown in FIG. 4, but it will be understood that other buttons, switches, and displays will typically be contained in control panel 44. These other buttons, switches, and displays may, for example, relate to paper feed control, slope corrections, and print mode selections.

Control panel 44 includes a Balance Access switch 46, Power switch 48, Setup Select switch 50, Balance switch 52, Initiate key 54, Store Time key 56, Store Normal key 58, and dichroic indicator lamps 60a, 60b, 62a, 62b, 64a, and 64b.

Balance Access switch 46 is a key operated switch which must be in the ON position in order to make changes in certain critical printer parameters, including color balance parameters. In this embodiment, therefore, a two level operating organization is provided similar to the organization described in a co-pending patent application by J. Pone Jr. entitled "Photographic Printer Control System", Ser. No. 867,897 filed Jan. 9, 1978 and assigned to the same assignee as the present invention. The use of an access key prevents accidental or unauthorized tampering with critical stored parameters.

Power switch 48 must be ON for any of the printer functions relating to color balancing to be performed. In addition, it must be ON when normal printing is being performed.

Figure 5A:
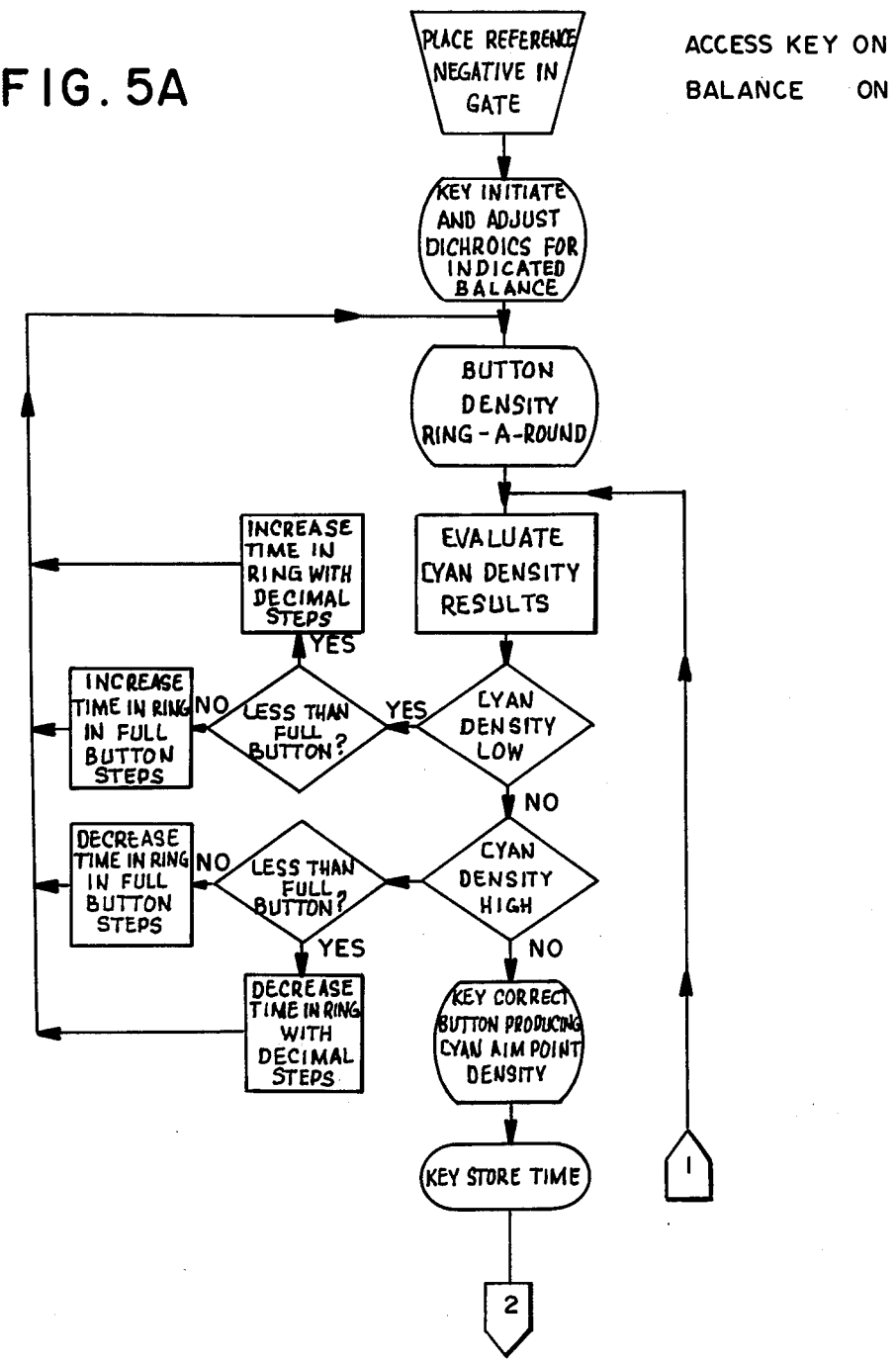
FIGS. 5A and 5B illustrate the color balance procedure of a preferred embodiment of the photographic printer of the present invention.
Figure 5B:
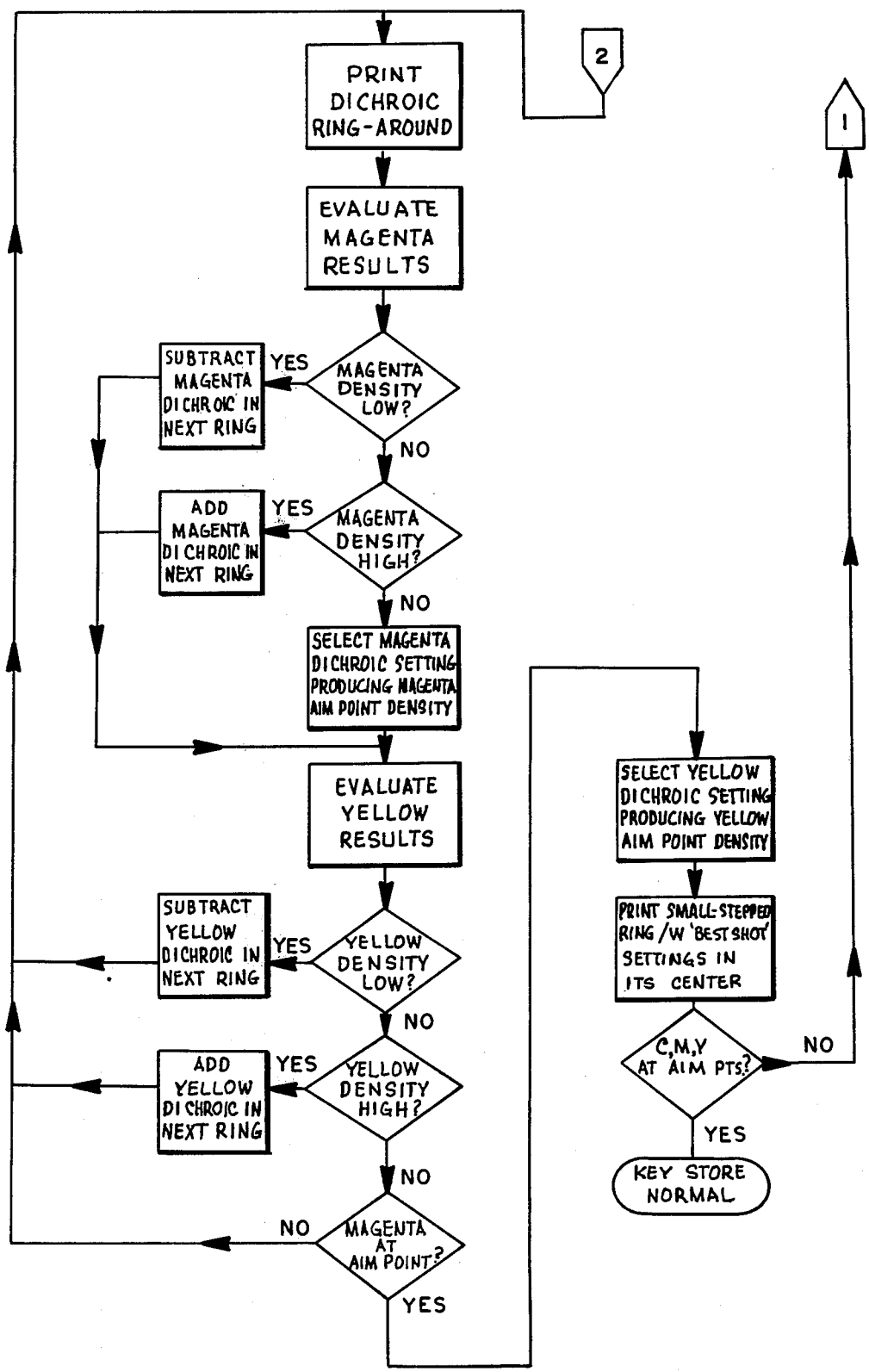

FIGS. 5A and 5B show the procedures performed by the operator in the initial color balancing of the printer. To perform the color balancing, the operator turns Access switch 46 and Balance switch 52 to the ON position and Setup Select switch 50 to the particular setup for which the color balancing is being performed. The operator then places a reference negative in the print gate of the printer.

In the preferred embodiment of the printer of the present invention, an initial exposure time for all three color channels and a universal initial set of LATD sensor signal values are stored in memory 38. These stored universal initial exposure times and sensor signal values establish a standard starting place for color balancing of all setups. These values are determined by the manufacturer and can not be altered by the operator of the printer. When the operator depresses Initiate key 54, microprocessor 34 loads the universal exposure time and sensor signal values into the storage dedicated for the selected setup.

As shown in FIG. 4 the cyan, magenta, and yellow dichroic filters have a pair of indicator lamps indicating the direction which control knobs 24a, 24b, and 24c should be turned to adjust the position of dichroic filters 22a, 22b, and 22c, respectively. Indicator lamps 60a, 62a, and 64a indicate that clockwise rotation of knobs 24a, 24b, and 24c is required, while indicator lamps 60b, 62b, and 64b indicate a need for counterclockwise rotation.

The indicator lamps are controlled as a function of the red, green, and blue signals from LATD sensors 30. These signals are converted to digital values in interface circuitry 40 and supplied to microprocessor 34. When Initiate key 54 has been depressed, microprocessor 34 compares the LATD signals then being produced with the universal initial sensor signal values. Based upon this comparison, microprocessor 34 lights the appropriate indicator lamps to indicate which direction the dichroic filters should be moved in order to make the LATD signals equal to the universal sensor signal values. When the LATD signals equal the universal signal values, both indicator lamps for each filter are lit simultaneously. This indicates to the operator that no further adjustments of filter position are necessary.

After the dichroic filters have been adjusted to their initial position, a color balancing ring-around technique is used to achieve the desired color balance. In the embodiment shown in the FIGS. 5A and 5B, the printer, when color balanced, will properly print the reference negative to the desired color densities with identical exposure times for all three color channels (i.e. dead heat printing).

As a result, when the operator initially determines the proper exposure time for one of the three channels, this determines the exposure time for all three channels. The dichroic filter settings for the other two channels are then adjusted to cause all three color channels to print the reference negative with that same exposure time. In the specific case shown in FIGS. 5A and 5B, the cyan filter is not moved from the initial position, and it is the cyan density results which are used to determine the exposure time for all three color channels. The magenta and yellow dichroics are then adjusted to yield the same exposure time.

As shown in FIGS. 5A and 5B, after Initiate key 54 has been depressed and the dichroics have been adjusted to their initial position, the printer is cycled and the operator performs a density button ring-around in which various density corrections are entered through button panel 42. During this ring-around procedure, microprocessor 34 controls the exposure times for all three color channels. When the exposure time is completed, microprocessor 34 actuates the shutter solenoid by providing signals through interface circuitry 40 to the appropriate solenoid driver. The exposure times for all three color channels are fixed, identical, and independent of the LATD sensor signals. During the initial button density ring-around, the synchronized fixed exposure times equal the initial universal time which was loaded from permanent storage within memory 38 into the setup block of storage for the select setup, plus or minus the time increments called for by the density buttons.

After developing the various prints made from the reference negative during the button density ring-around, the operator evaluates the cyan density results and determines whether the density is too low, too high, or is the desired ("aim point") density. Since a variety of button corrections have been provided during the ring-around, the operator may select the button correction which yielded the best cyan density results and then determine whether further correction is required. If further correction beyond that provided in the first button density ring-around is required, the button density ring-around is again performed with still larger or smaller corrections being made. The results are again evaluated, and when it is finally determined that the proper cyan density has been provided, the operator enters, through button panel 42, the button correction which produced the cyan aim point density. The operator then depresses the Store Time key 56, which causes microprocessor 34 to store the density correction entered by button panel 42 as the normal density for the selected setup. For example, if the operator, after evaluating a density ring-around, determines that a +2D correction yields the desired cyan aim point density, the +2D is entered through button panel 42 and displayed on the display of button panel 42. When Store Time key 56 is depressed, microprocessor 34 adjusts the universal starting exposure time by the desired density correction to produce a new normal exposure time for the selected setup. This new exposure time is stored in memory 38 in the setup block, and thereafter the printer will print the reference negative at the new exposure time for all three channels without the necessity of entering a button correction.

Once the normal exposure time has been determined for the reference negative, a dichroic filter ring-around must then be performed for the remaining two dichroic filters so that all three colors are being printed properly at the stored normal exposure time. This is achieved by a dichroic filter ring-around in which the yellow and magenta dichroics are moved stepwise into the path of the light, and a print is made at each of the filter settings.

After the prints have been developed, the operator evaluates the magenta and the yellow results and determines whether the proper dichroic settings have been achieved. If not, the dichroic ring-around is again performed. When the yellow and magenta density aim points have been found, the operator selects the dichroic settings which produce the aim point densities and may then make a final "best shot" ring-around with small steps to find the optimum filter settings. If the cyan, magenta and yellow densities are not then at their aim points, the ring-around procedure may be repeated again, beginning with the button density ring-around, as shown in FIGS. 5A and 5B.

When the cyan, magenta, and yellow densities are at their aim points (i.e. the dichroic filters are at their proper position to print at the stored normal exposure time, the operator then depresses Store Normal key 58. A test cycle is initiated which brings the print lamps up to their print voltage, and after a slight delay the LATD sensor signal values are stored.

This color balancing procedure is performed for each of the various setups by changing the setting of Setup Select switch 50. When the operator decides to change from one setup to another, he first changes the setting of Setup Select switch 50. The same reference negative which was used in color balancing that particular setup is again inserted in the print gate, and the lamps are brought up to printing voltage by hitting the Expose button or setting the multiple print counter to multiple prints, or by turning the Print/Focus switch (not shown) to Focus. The printer repeatedly cycles and microprocessor 34 compares the red, green, and blue LATD signals being produced with normal sensor signal values which were stored for that setup. Microprocessor 34 controls indicator lamps 60a, 60b, 62a, 62b, 64a, and 64b as a function of these comparisons. The operator adjusts the filter positions as indicated by the indicator lamps until both lamps for each filter are lit. This indicates that the printer is again in balance for that selected setup, and normal printing may be commenced.

It can be seen, therefore, that the present invention provides a simple and accurate method of restoring or returning the printer to color balance for each of a plurality of stored setups. This is achieved by storing signals which are indicative of the desired position of each of the filters when color balance is achieved for that particular setup. Since LATD sensors are used in the printer described in the Figures, storing LATD sensor values for a reference negative is a convenient parameter which may be sensed without any additional hardware. It can be seen, however, that other parameters, such as a direct measurement of the displacement of the filters, could be used in more complex systems, or systems which do not have LATD sensors.

Similarly, although the present invention specifically shows indicator lamps which indicate clockwise or counterclockwise movement of the dichroic filter adjustment knobs 24b-24c, other indicators of various forms may be used to provide indications to the operator of the required adjustments in filter positions in order to return to color balance for the selected setup. In addition, in more complex sophisticated equipment, a motor could be used to control the position of the filters, and the signals generated by microprocessor 34 from the comparison of the sensed and stored sensor signal values could be used to control the motor, and therefore the filter positions.

The preferred embodiment of the present invention shown in the Figures is a simple and low-cost system which assures rapid and simple readjustment to balance whenever setups are changed. This is achieved with an absolute minimum of additional hardware.

Although the present invention has been described with reference to preferred embodiments, workers skilled in the art will recognize that changes may be made in form and detail without departing from the spirit and scope of the invention.

What is claimed is:

1. In a photographic printer using variable exposure times, the improvement comprising:
    light source means for providing light for printing;
    a plurality of filters movable into and out of the light to adjust the intensity of the light in a plurality of color channels;
    sensing means for sensing density in each color channel of a film positioned in the path of the light, and providing sensor signals as a function of the sensed densities;
    storage means for storing, for each of a plurality of setups, a signal indicative of an exposure time for each of the color channels to be used in printing a print of desired densities from a reference film associated with the setup, and sensor signal values produced when the filters are in their desired filter positions to print the print of desired densities from the reference film using the exposure time for each of the color channels;

setup select means for selecting one of the plurality of setups;

means for comparing, during re-establishing of color balance for a selected setup, the stored sensor signal values and sensor signals for the sensing means for each color channel indicative of sensed densities of the reference film then in the path of the light; and means for providing signals indicative of the direction of movement, if any, necessary to move the filters to the desired filter positions for the selected setup based upon the comparison.

2. The invention of claim 1 and further comprising:

visual indicator means for providing a visual indication to the operator of the direction of movement, if any, necessary to move the filters based upon the signals.

3. In a variable exposure time photographic printer having a light source for providing light for printing and having filters for adjusting the color content of the light from the light source based upon their positions in the path of the light, the improvement comprising:

storage means for storing, for each of a plurality of setups, predetermined red, green, and blue exposure times to be used in printing a print of desired print densities from a reference film associated with the setup, and red, green, and blue sensor signal values when the filters are in their desired filter positions to print the print of desired print densities from the reference film using the predetermined red, green, and blue exposure times;

setup select means for selecting one of the plurality of setups;

sensing means for sensing red, green, and blue densities of a reference film placed in the path of the light and producing red, green, and blue sensor signals; and position adjustment determining means for determining necessary filter position adjustments as a function of the stored red, green, and blue sensor signal values and the red, green, and blue sensor signals.

4. The invention of claim 3 and further comprising:

indicator means for indicating to an operator the necessary filter position adjustments determined by the position adjustment determining means.

5. The invention of claim 3 wherein the position adjustment determining means comprises:

means for comparing the red, green, and blue sensor signals and the stored red, green, and blue sensor signal values; and means for providing filter position signals indicative of the direction of movement, if any, necessary to move the filters to the desired filter position for the selected setup based upon the comparison.

6. The invention of claim 5 and further comprising:

visual indicator means for providing a visual indication to the operator based upon the filter position signals.

7. A method of re-establishing color balance of a variable exposure time photographic printer, the method comprising:

storing exposure times for printing a reference film for each of a plurality of setups;

determining for each of the plurality of setups red, green, and blue density values of the reference film when filters are in their desired position to print a print having desired print densities from the reference film using the stored exposure times;

storing the red, green, and blue density values;

selecting one of the setups;

measuring red, green, and blue densities of the reference film;

comparing the stored and the measured red, green, and blue density values;

providing signals indicative of the direction of filter position adjustment based upon the comparison of density values; and adjusting filter positions in the directions indicated by the signals.

8. A method of color balancing a variable exposure time photographic printer of the type having a plurality of color channels, having a plurality of movable filters for adjusting the intensity of light of each of the plurality of color channels, and having large area transmission density (LATD) sensors, the method comprising:

placing a reference film in a light path of the printer;

adjusting filter positions until measured LATD sensor values correspond to predetermined initial LATD sensor values;

printing a plurality of prints independent of LATD sensor values during printing using a common predetermined initial exposure time modified by different incremental density corrections;

entering the incremental density correction which provided a desire color density for one of the color channels;

deriving a common corrected exposure time for use with all of the plurality of color channels from the initial exposure time and the entered incremental density correction;

storing the common corrected exposure time;

printing a plurality of prints independent of LATD sensor values during printing using the corrected exposure time for all color channels but with different filter positions for filters controlling the intensity of light in the remaining color channels;

adjusting the positions of the filters to the positions which yielded the desired color densities for the respective remaining color channels; and storing LATD sensor values when the filters are in positions which yield the desired color densities for the respective color channels.

9. The method of claim 8 and further comprising:

re-establishing color balance by reinserting the reference film, comparing measured LATD sensor values to the stored LATD sensor values, and moving the filters until the measured LATD sensor values correspond to the stored LATD sensor values.

10. A method of color balancing a variable exposure time photographic printer of the type having a plurality of color channels, having a plurality of movable filters for adjusting the intensity of light in each of the plurality of color channels, and having large area transmission density (LATD) sensors, the method comprising:

placing a reference film in a light path of the printer;

adjusting filter positions to predetermined initial positions;

printing a plurality of prints using a predetermined initial exposure time modified by different incremental density corrections;

entering the incremental density correction which provided a desired color density for one of the color channels;

deriving, from the predetermined initial exposure time and the entered incremental density correction, a corrected exposure time;

printing a plurality of prints using the corrected exposure time for all of the plurality of color channels, but with different filter positions for filters controlling the intensity of light in the remaining color channels;

adjusting the positions of the filters to the positions which yielded the desired color densities for the respective remaining color channels; and storing LATD sensor values when the filters are in positions which yield the desired color densities for the respective color channels.

* * * * *